United States Patent [19]
Gardos

[11] Patent Number: 5,136,555
[45] Date of Patent: Aug. 4, 1992

[54] INTEGRATED DIVER FACE MASK AND ULTRASOUND UNDERWATER VOICE COMMUNICATION APPARATUS

[75] Inventor: Ivan Gardos, Montreal, Canada
[73] Assignee: Divecomm, Inc., Concord, N.H.
[21] Appl. No.: 726,315
[22] Filed: Jul. 5, 1991
[51] Int. Cl.$^5$ ............................................. H04B 11/00
[52] U.S. Cl. .................................... 367/132; 367/901
[58] Field of Search ................................ 367/132, 901

[56] References Cited

U.S. PATENT DOCUMENTS

| | | | |
|---|---|---|---|
| 2,798,902 | 7/1957 | Kursman et al. | 367/132 |
| 3,003,136 | 10/1961 | Burnett | 367/132 |
| 3,076,174 | 1/1963 | Wainwright et al. | 367/132 |
| 3,150,345 | 9/1964 | Freeman | 367/132 |
| 3,164,800 | 1/1965 | Kroenert | 367/132 |
| 3,172,076 | 3/1965 | Alinari | 367/132 |
| 3,174,129 | 3/1965 | Laughlin et al. | 367/132 |
| 3,181,115 | 4/1965 | Wainwright | 367/132 |
| 3,181,116 | 4/1965 | Gordon | 367/132 |
| 3,218,607 | 11/1965 | Brock et al. | 367/132 |
| 3,230,500 | 1/1966 | Dunn | 367/132 |
| 3,231,852 | 1/1966 | Kritz | 367/132 |
| 3,263,207 | 7/1966 | Kroamer et al. | 367/132 |
| 3,267,414 | 8/1966 | Kritz | 367/132 |
| 3,337,841 | 8/1967 | Wainwright et al. | 367/132 |
| 3,347,230 | 10/1967 | Cupp | 367/132 |
| 3,359,535 | 12/1967 | Webb et al. | 367/132 |
| 3,451,039 | 6/1969 | Epstein et al. | 367/132 |
| 3,469,231 | 9/1969 | Geiling et al. | 367/132 |
| 3,789,353 | 1/1974 | Hunter et al. | 367/132 |
| 3,790,891 | 2/1974 | Bjelvert | 367/132 |
| 4,039,999 | 8/1977 | Weston | 367/132 |
| 4,041,441 | 8/1977 | Johnson | 367/116 |
| 4,096,466 | 6/1978 | Johnson | 367/132 |
| 4,123,622 | 10/1978 | MacLeod | 367/132 |
| 4,154,981 | 5/1979 | Dewberry et al. | 367/132 |
| 4,276,624 | 6/1981 | Fisher et al. | 367/134 |
| 4,418,404 | 11/1983 | Gordon et al. | 367/132 |
| 4,432,079 | 2/1984 | Mackelburg et al. | 367/132 |
| 4,527,657 | 7/1985 | Payne | 367/132 |
| 4,604,737 | 8/1986 | Hoffman | 367/134 |
| 4,839,871 | 6/1989 | Massey | 367/132 |
| 4,885,796 | 12/1989 | Loftus et al. | 455/100 |
| 4,949,072 | 8/1990 | Comerford et al. | 367/134 |

Primary Examiner—Daniel T. Pihulic
Attorney, Agent, or Firm—Rines and Rines, Shapiro and Shapiro

[57] ABSTRACT

A novel totally integrated divers face mask and ultrasound underwater voice communication apparatus having integral transducer-transmit-receive-power source enclosures of low profile, flexible hands-free-voice or push-to-talk operation while submerged, and noise-cancelling microphone features for reducing bubble and vibration noise.

8 Claims, 4 Drawing Sheets

INTEGRATED DIVER FACE MASK AND ULTRASOUND UNDERWATER VOICE COMMUNICATION APPARATUS

The present invention relates to underwater communications systems and apparatus, being more particularly directed to underwater voice communication apparatus, as for divers, using ultrasound transmission and reception.

BACKGROUND

For many years, the art has struggled with the myriad of problems involved in divers communicating between one another underwater, or with other underwater locations or with the surface. Many proposals have been suggested and developed over the years for simplifying the communication apparatus carried by the diver, suppressing inhalation and other noises extraneous to the desired voice signals, improving the ultrasonic (radio-frequency) transmission and reception systems and component parts, and, in some instances, associating transducers, microphones and head sets with the diver's mask equipment and ancillary thereto. Illustrations of these struggles are represented, for example, by the following prior U.S. Pat. Nos.: 3,003,136, 3,076,174, 3,150,345, 3,164,800, 3,172,076, 3,174,129, 3,181,115-6, 3,230,500, 3,231,852, 3,267,414, 3,359,535 and 3,451,039, dealing with separate housings for electrical and electronic parts, connections and/or transducers, etc. adapted for being carried external to the diver mask and on various parts of the diver's body or even hand held; 3,790,891 and 4,154,981, dealing with alleviation of extraneous inhalation and other noises; 3,789,353, concerned with voice actuation of underwater transmission; 3,218,607, 3,347,230, 3,469,231, 4,041,441, 4,527,657, 4,839,871 and 4,885,796, treating with separate headsets, transducers and/or electronics external to or cooperative with the face mask (including, also, current apparatus of Orcatron Company of Vancouver, Canada), and, in connection with 4,123,622, for example, inside the face mask; 2,798,902, 4,418,404 and 4,432,079, concerned with single-sideband suppressed carrier improved ultrasound transmission and reception systems; and more general underwater telephone communications systems represented by 3,231,852, 3,263,207, 3,337,841, 4,039,999, 4,276,624, 4,604,737 and 4,949,072.

All of the above, and other proposals, have represented attempts to simplify apparatus and/or to improve upon the performance and user comfort and facility residing in the equipment. A promising approach before the present invention has resided in the beforementioned attachment to the mask of a headset carrying the transducer and other components.

Despite these efforts, however, many limitations and problems still remain —— among them, limitations inherent in separate headphones or headsets of such character that are to be diver-applied to the face mask, even assuming susceptibility to field replacement of batteries or other maintenance procedures. Such proposals, in the first place, are generally limited to face masks that are not already provided with built-in headphones; secondly, they require that the diver apply the face mask and then separately apply the headphone communication system. This is very undesirable in view of the complexity and time required and, indeed, the need for very vulnerable cable connectors for interconnecting the mask and the separate headphone communication system, even where the microphone through which the diver must speak is contained within the mask. Particularly for indutrial and military operations where there is great stress on the diver and often the need for fast operation, the concept of separate devices —— one, a mask with microphone capability, and the other a separate communication system and interconnections —— has proven far from desirable.

Other approaches, above-mentioned, employ a separate housing carried by the diver, as, for example, on the body, and/or also carrying a separate transducer, again connected by interconnecting cables to the mask, all having similar problems; and, additionally, as later pointed out, suffering from deleterious body shadowing of the ultrasound communication field.

Underlying the present invention, on the other hand, is the discovery that there can actually be successful total integration of the ultrasound communication system and components into the mask structure, and in a manner that enables the utilization of full face masks having headphones already provided therein for prior art types of communication systems. This integrated mask communication system concept also embodies rather novel and critical packaging concepts for the electronics and battery power sources, not only to enable ready replacement of batteries and replacement modules and the like, but, to provide minimally low profile and protrusions from the mask structure. This is important in diving operations, not just because divers are uncomfortable with protrusions, with their attendant possibility of fouling with other devices and materials in the ocean, but also to insure minimum potential shadowing or blind spot effects in the ultrasound radiation and receiving field patterns.

Subsidiary, though important, features of the total communication system-mask integration concept of the invention reside in (1) the obviating of any possibility of vulnerability, damage or disconnection of cable or other interconnections between the communication system electronics and transducer system and the microphone and earphone systems within the mask; and (2) improvements in the voice transmission through more adequate suppression of undesirable accompanying inhalation, air-hose regulator and other vibrations and sounds inherent in the diving operation. The latter result is attained by a novel microphone system, incorporated into this integrated mask-communication system, that enables voice transmission with minimum interference from the vibrations that occur in the mask system as a result of bubbles, breathing sounds and other extraneous noises that normally are transmitted by the voice microphone. This feature that enables such effective discrimination of vibrations picked up by the mask structure from the desired diver's voice sounds appears also to be applicable to other types of systems, as well, where similar interference suppression may be desired.

Still a further feature of the mask-communication integration in accordance with the invention, is the universal applicability of the construction not only to present-day masks, but also to future masks specifically designed to incorporate cavities for receiving the communication system within the mask itself as an integrated system. It has been found, moreover, that the rather deleterious effect of the relatively high positive buoyancy of masks is ameliorated somewhat through the negative buoyancy weight characteristics of the integrated communication system, thus often eliminating the need for applying weights to the mask in order to resist the constant pressure of pushing the head up as a result of such mask buoyancy.

Objects of Invention

The primary object of the present invention, accordingly, is to provide a new and improved integrated face mask and underwater voice communication system that, to a large degree, obviates many if not all of the above-described limitations of previous proposals and apparatus.

A further object is to provide such a novel apparatus that reduces to a very minimum the efforts of the diver in applying, using and maintaining the system, eliminates all external cables and connections and exposure of such, and insures against fouling and ultrasound field interference.

Still another object is to provide a novel construction universally adaptable to face masks, including as a retrofit, and, in addition, where desired, an improved degree of suppression of noises extraneous to voice sounds that may also be useful in other applications as well.

Other and further objects will be explained hereinafter and are more particularly delineated in the appended claims.

SUMMARY

In summary, however, from one of its viewpoints, the invention embraces an integrated diver's face mask and ultrasound underwater communication apparatus having, in combination with the face mask, a pair of adjacent first and second enclosures integrally connected transversely along and to the top of the mask, the first enclosure containing ultrasound frequency transmitting-receiving electronics and the second containing a battery power supply, with an ultrasound transducer provided at the forward end of the first enclosure; earphone means connected at the sides of the mask integrally therewith and exposed inwardly thereof; microphone means supported near the lower portion of the mask within the same and on one side thereof; and electrical connections laid along the mask surfaces to interconnect the microphone to the transmitting electronics and the earphones to the receiving electronics in the first enclosure, and the said transmitting-receiving electronics in the first enclosure to the battery power supply in the second enclosure.

Preferred and best mode embodiments and designs are hereinafter set forth in detail.

DRAWINGS

The invention will now be explained in connection with the accompanying drawings, FIG. 1 of which is an isometric view of a preferred form of integrated face mask-ultrasound voice communication system construction in accordance with the invention;

DESCRIPTION OF PREFERRED EMBODIMENT(S)

Figure 1:
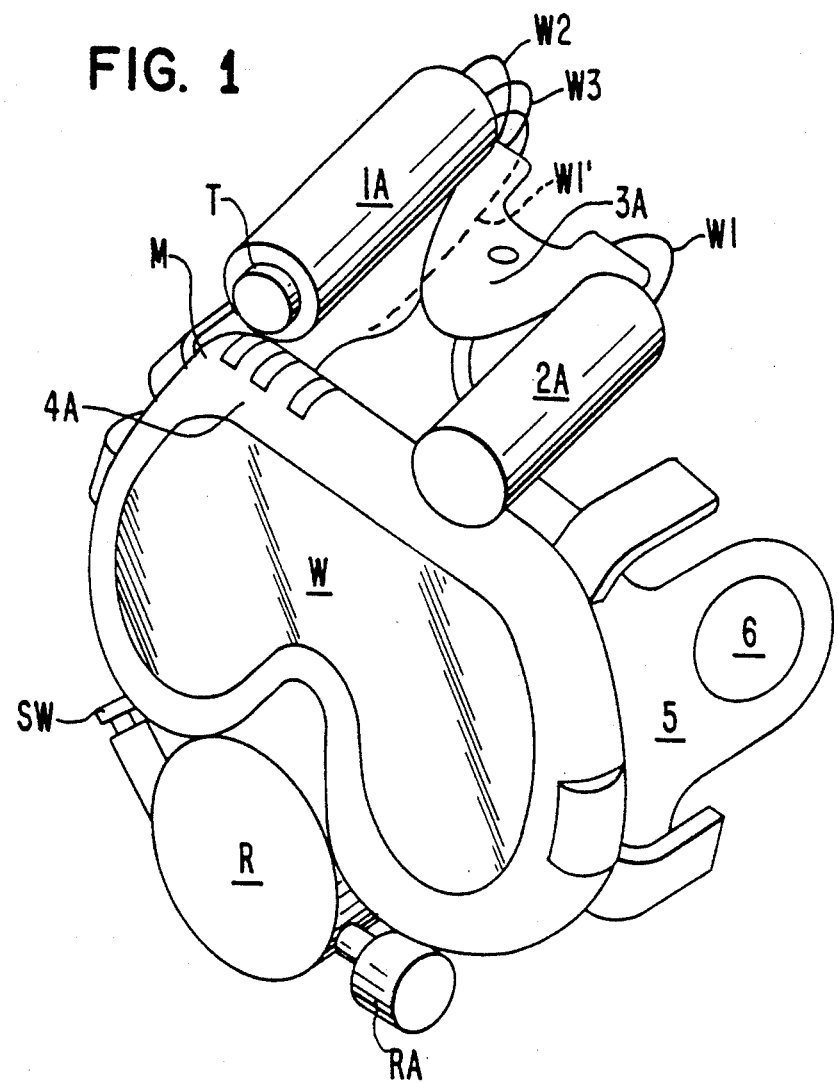

Before proceeding to a description of the apparatus exemplarily shown in the drawings, it is believed conducive to an understanding of the reasons underlying such construction to highlight the major philosophy underlying the design of the system, which resides in the provision of an integrated, single, ready apparatus —— something that does not need to be assembled when one arrives at the working site or has to be applied in several steps. While, in a commercial environment, that is a serious inconvenience, in a military situation that can become critical. The development, thus, of a communication system which is integrated into the mask in such a manner that it can be used at all times without any assembly or other accessory activities, greatly enhances the usefulness of the system. The second major advantage of the integration of the system into the mask is the elimination of any free external cables or connector systems which, in the ocean particularly, are highly vulnerable and continuously subject to breakdown. Another important aspect of integrating the communications system into the mask is the aspect of safety in case of an emergency. In some systems, represented by some of the above-listed patents, where the electronics or parts thereof and the mask are separate and are to be attached at or near the weight belt, the emergency ditching of the weight belt can cause the electronics to be disconnected or may result in the mask being ripped away from the diver's face, creating a potentially fatal situation. By integrating the electronics into the mask itself, this and similar situations can never occur.

Another important aspect that must, in practice, be addressed is the problem of maintainance — the ability to interchange parts, replace batteries, etc. rapidly with minimal effort, and to take up the minimum amount of space possible for the equipment involved.

In some other systems, including some disclosed in the above-listed patents, the push-to-talk switch (PTT) is actually attached to the electronics unit or it dangles from the electronics unit by a remote cable. In accordance with the invention, however, the push-to-talk switch is integrated into the mask itself and further provides the diver with the certainty of position of the activating device since the switch is permanently attached in a fixed position on the mask itself.

Another unique feature is a switch design that can change the operation of the transmission from a push-to-talk mode, wherein one has to push the button in order to transmit, to a mode where transmission is activated merely by voice alone (VOX). The ability to change from one mode to another underwater can be very important in various situations, including where the diver gets into a highly noisy area that prevents proper activation or de-activation of the voice control. The design of the microphone, moreover, effectively and automatically to reject noises that are generated within the diver's body and the framework of the mask and air regulator itself to assure the clarity of speech, also represents an important improvement.

Turning, now, to the implementation of FIG. 1, the communications apparatus electronic package has been designed for integrated attachment to current-day full face masks having provision for earphones and microphones, such as, for example, the Type EXL26 manufactured by Diving Systems International of Santa Barbara, Calif. As will be later more evident, the invention is also adapted for integration with air type masks and for ultimate incorporation in masks of the future provided with molded or other cavities as part of the mask to receive the apparatus.

The mask in FIG. 1 is shown at M with its transparent window W for eye vision, and with integrally carried upper adjacent, but spaced, low-profile compacted cylindrical housing enclosures 1A and 2A. The cylinder 1A on the upper left surface of the mask M contains or encloses all the electronics necessary for the communication operation, including the forward end transducer T that transmits and receives the ultrasonic signals. The transducer may be made of piezoceramic material, for example, in cylindrical form as shown. The adjacent similar cylinder 2A, illustrated as parallely arranged at the right-top of the mask M in FIG. 1, is the battery compartment containing the power source battery.

Figure 2:
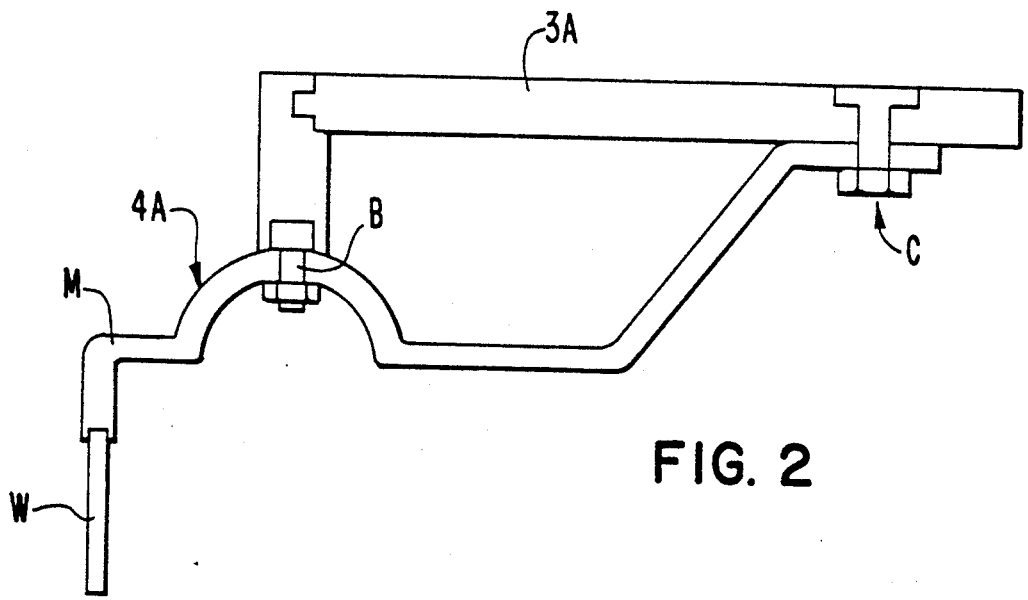
FIG. 2 is a transverse section showing the details of one form of mask attachment.

Cylinders 1A and 2A are attached to the upper frame portion 4A of the mask M by a bracket 3A, as by screws or welding, depending upon the particular model of mask to which the electronics is fitted. In FIG. 2, this is shown effected by bolts and nuts attaching the bracket through the plastic frame, with holes tapped into the plastic frame through which the bolts B and C are extended, providing basically a 3-point attachment.

Figure 3:
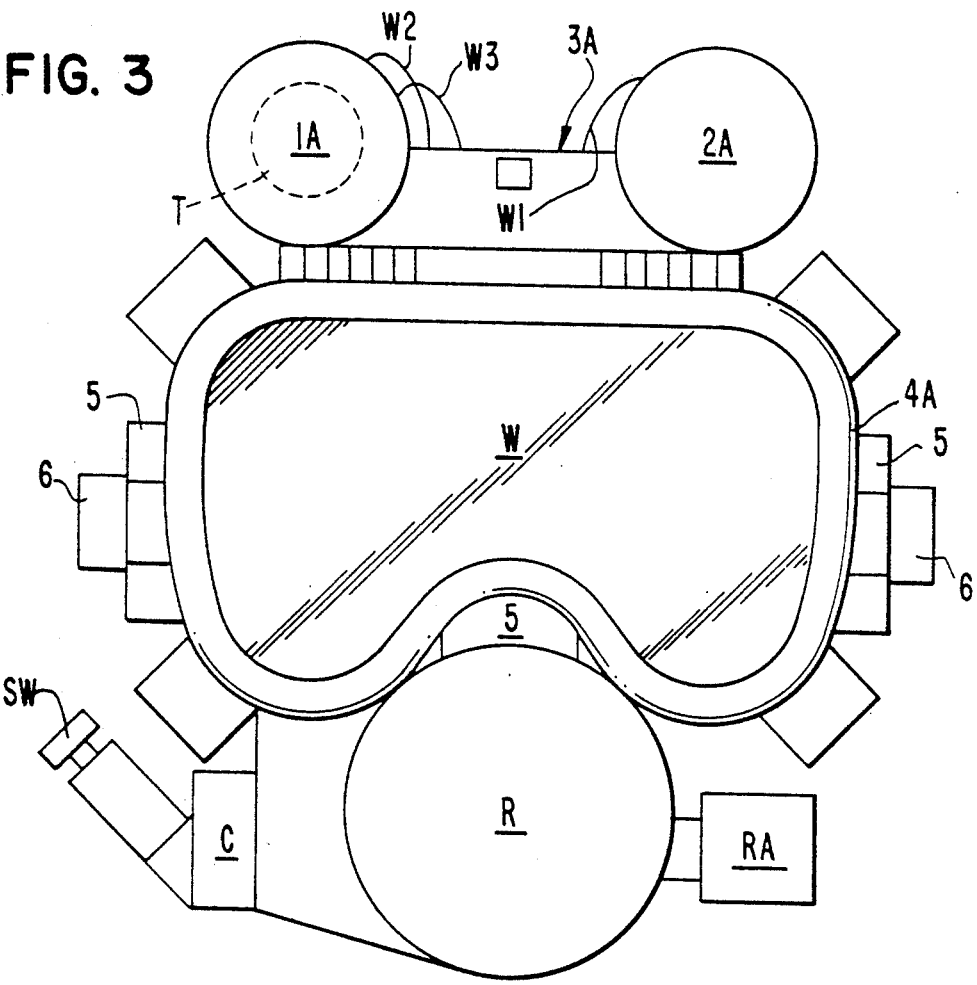
FIG. 3 is a front view of the apparatus of FIG. 1.

The before-mentioned push-to-talk switch SW is shown attached to the lower left in FIGS. 1 and 3, integrated with the mask itself. When the switch is in its neutral position, the system will automatically receive a signal in a so-called reception mode. When transmission is desired, the switch SW is depressed, activating such transmission. When transmission is finished, the diver releases the switch SW, with its spring (not shown) returning the switch to its original center receiving position.

When the diver desires to activate transmission by voice, therefore, the diver pulls outward on switch button SW. In this position, transmission is activated by use of voice alone, as later more fully described in connection with FIG. 6. In order to stop transmitting, the diver must cease to talk, at which point transmission will switch off. The moment transmission switches off, the unit switches over automatically to the receiving mode ready to receive a signal if there is a signal. It requires no activation on the diver's part. Once the switch is in this mode, there is no physical pushing — there is no physical activity that is necessary to activate the switch. The switch remains in the pulled out position and the system will switch back and forth between reception and transmission strictly depending upon the diver's voice, as will be explained hereinafter.

Figure 4:
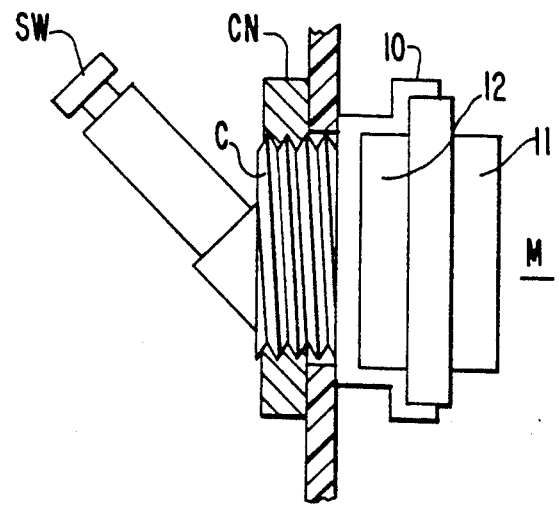
FIG. 4 is an expanded detail of the integrated microphone section of FIG. 3.

The earphones are actually embedded in a part of the mask M called the face seal represented at 5, sealing out the water and contacting the frontal area of the face. It does not, in the type of mask before-referenced, go completely around the head from front to back, but is strictly on the front of the face. These types of systems are called full-face masks because they cover the entire frontal area of the face. In the particular mask that is shown in the drawings, two molded pockets are provided, one on each side of the mask M, in which reside a pair of left and right headphones 6, exposed inwardly of the mask thus integrated into the mask itself. In retrofitting existing masks, all the electrical connection wiring is also included within or along and against the mask itself. Such may be adhered or molded to surfaes of the mask, as well. Nothing is hanging or dangling external to the mask. The insulated wiring W1 from the transducer-transmitter-receiver circuits and related electronics (later described in connection with FIG. 6) exits the rear of the cylinder 1A, FIGS. 1 and 2, and passes underneath the bracket (dotted lines W1') to the battery cylinder 2A. Insulating wiring W2 and W3 also exit the rear of cylinder 1A and are passed underneath the bracket 3A and down and laid adjacent and along the side surface of the mask down to the push-to-talk port for the push-to-talk switch SW, and to the headphones 6, and to the microphone M in the lower communications port C of the mask to the left of the regulator part R with its regulator adjustment RA. As more particularly shown in FIG. 4, the communications port C is a plastic housing integrally threadedly held in the frame of the mask at CN with the internal microphone M mounted therein.

Figure 5:
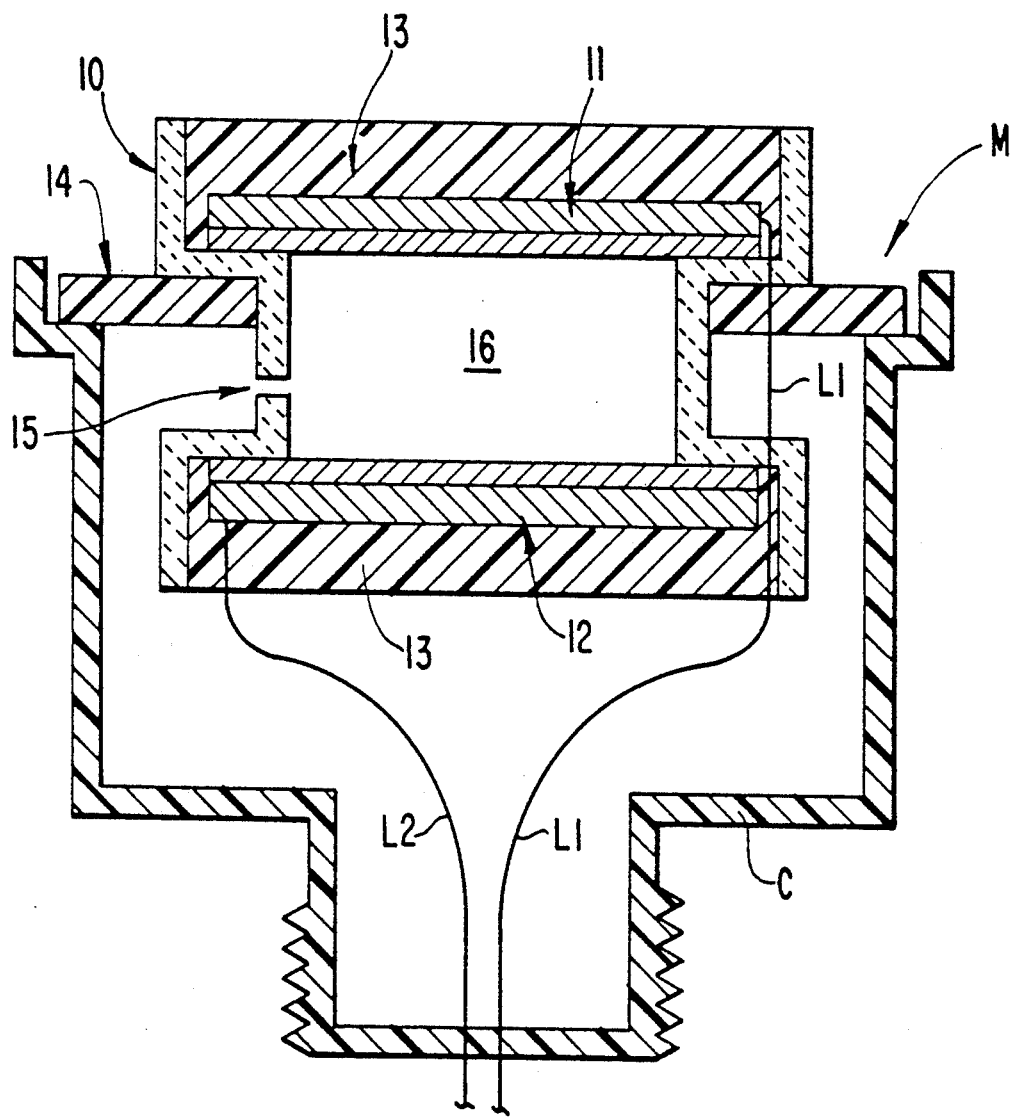
FIG. 5 is a cross-section upon a more enlarged scale showing the inner construction of the microphone and noise suppression system thereof.

It is now in order to describe the details of the microphone M and its associated system for eliminating much of the vibration and other extraneous noise in the mask system. The main body of the microphone M, FIGS. 4 and 5, consists of a parallel piezoceramic element system 10-11-12 in which the element 11 picks up the diver's voice, facing inside the mask adjacent the regulator R, and the element 12, facing the wall of the mask and serving as a vibration compensation element. In practical apparatus embodying the invention, the polarity of such elements as they are mounted in the main body is such that, subjected to vibrations in the same direction, their signals are out of phase and therefore they cancel each other, as later explained. The elements themselves, as well as the microphone, are then molded and covered, as by polyurethane 13, FIG. 5, applied on the two sides to cover both elements 11 and 12. This effectively seals the elements and renders them waterproof, which is a very critical feature of the underwater communication system. Whether from condensation or leakage, these microphones are always subjected to high levels of moisture and, unless completely waterproof, have a very short life. A mounting ring 14 as of polyurethane, again molded to the microphone itself, helps to absorb and isolate some of the vibrations. A pressure relief port is provided at 15 which allows the inside cavity 16 of the microphone to be equal in pressure to that which exists within the mask. Should this pressure relief port not exist, as depth is increased by the diver, the greater pressure would eventually crush the elements. The pressure relief port further serves to control the frequency response of the microphone.

In operation, this structure serves admirably to discriminate voice from the vibration sounds of bubbles and air and breathing that set the mask into vibration. First, as before stated, the mounting ring 14 actually isolates element 12 (which serves as the vibration compensation element) from the voice, because the support ring 14 and the communications port C actually are in contact and therefore seal the sound and restrict the voice from entering into the rear of the microphone. At the same time, it is in physical contact with the port C which, in turn, physically contacts the mask itself. The mode of vibration travel is through the frame of the mask, which is where the noise is first created, and which is then coupled through C, traversing through the support ring 14, and entering into the microphone. When this vibration enters, it equally vibrates both element 11, which is the one that picks up the voice, and element 12 which picks up the external vibration. That is to say, both elements 11 and 12 receive almost equal amounts of vibration excitation; but since they are opposite in polarity, the vibration itself is cancelled out. Thus, microphone element 11, which is considered to be the front of the microphone itself, as before stated, faces the diver's mouth and is therefore directly exposed to the diver's voice, its signal being fed along $L_2$, FIG. 5. Element 12, at the rear of the microphone, is isolated from the diver's voice by the mounting or support ring 14 as well as by the communications port C. Vibration, on the other hand which is created in the body of the mask to which the port C is attached, couples into the microphone through support ring 14 and, as just indicated, equally excites both elements 11 and 12. But since the signals from these elements are added together at conductors $L_1$, and they are opposite in polarity, they cancel. This way, there is no cancellation of the voice at $L_2$, but there is cancellation of the physical vibrations entering into the microphone. The result of this operation is added clarity for two reasons. First, the breathing and exhaling that create serious vibrations within the mask are eliminated. Secondly, as one is talking, the cavity of the plastic frame tends physically to resonate, helping to reduce the entry of that resonation and tending to form fairly severe peaks in the frequency response that assist in keeping the voice more natural than otherwise would be the case.

Figure 6:
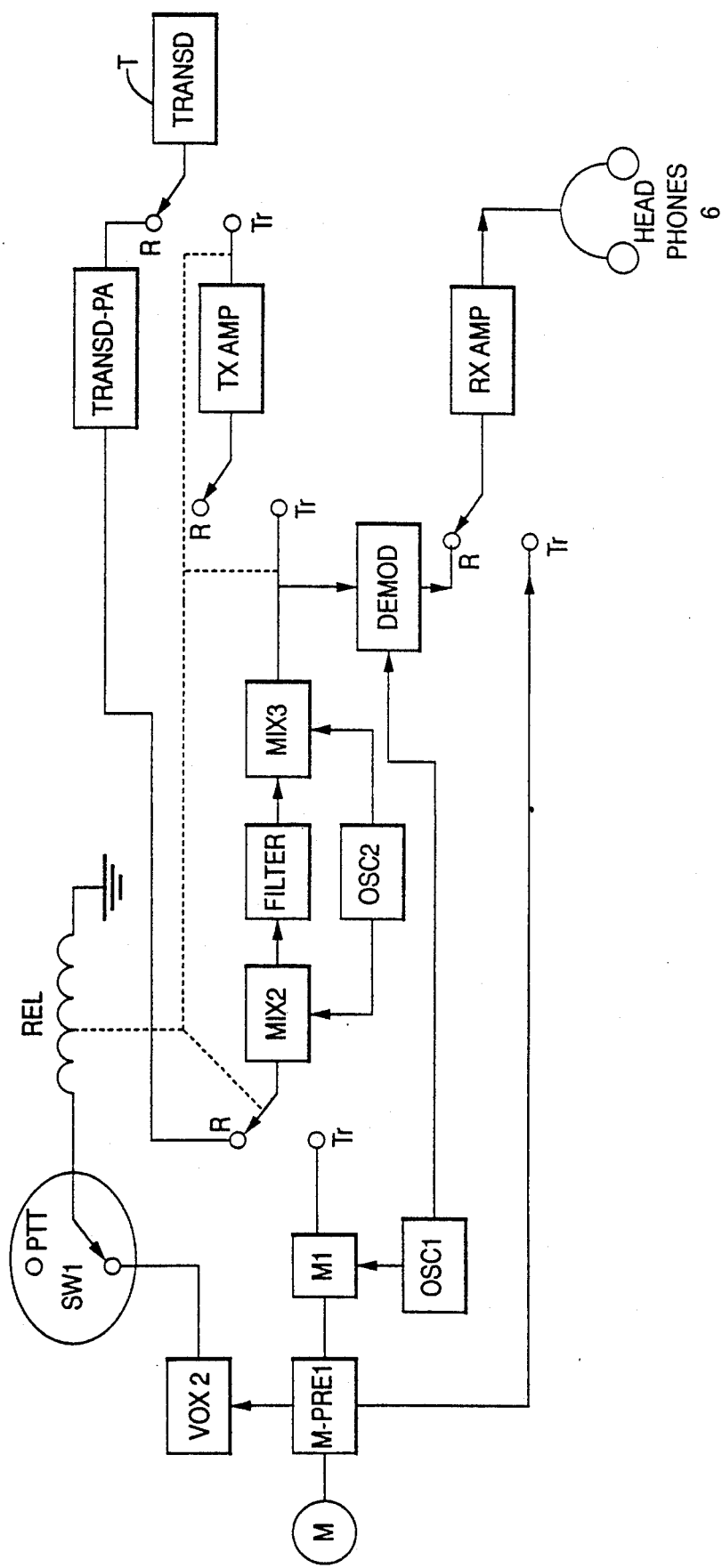
FIG. 6 is a combined circuit and block diagram of the communication system.

Referring now to FIG. 6, a useful circuit implementation in block diagrammatic form is presented illustrative of various options available to the diver in terms of transmission, reception under switch control or under automatic voice control as before described.

The system works in the following manner in the transmission mode. The signal from the microphone M, shown to the left, is preamplified by the microphone preamplifier M-PRE1. As before discussed, the diver may select by switch SW1 either a VOX or a push-to-talk PTT mode. If in a VOX mode, the detection at VOX 2 causes the system to switch over into the transmission mode (switch position Tr). The various contacts of the transmit-receive relay REL (R-Tr positions) are schematically shown switch-ganged by dash lines in FIG. 6. In this VOX mode, the microphone preamplifier M-PRE1 feeds into the headphone amplifier RX-AMP and to the headphones 6. In this manner, the diver hears his own voice in the headphones to signify that he is, indeed, transmitting —— this being a confirmation of such fact. Simultaneously, the signal from the microphone preamplifier is fed to a mixer M1 which mixes the microphone signal along with the signal from a first oscillator OSC1, which is the signal of the ultrasound carrier itself, say 32.5KHz. The signal then travels through the receiving-transmit relay, REL, to switch to the Tr contact position, with the signal travelling to mixer MIX2, where it is hetrodyned up to, say, 455 KHz, and then passes through a filter labelled FILTER. The filter is adjusted in such a way as to filter out the upper side band and allows only the lower side band to go through. The signal then exits the filter and enters a further mixer MIX3 into which is also fed the frequency from another oscillator OSC2 that serves to convert the signal back down again to the transmit or carrier frequency. With the transmit relay contacts at Tr, the single sideband signal is applied to the transmitter amplifier marked TXAMP and thence, through the transmit and receive relay contacts in Tr position, to the transducer T, where the ultrasound signal is then transmitted outwards. This is the basic transmission process, with voice preferably amplitude-modulating the transmission.

For reception, the relay REL and its contacts (R-Tr) are in the receive (R) position, where they normally are, as shown in FIG. 6, unless transmit is activated. In this situation, the received ultrasound signal at the transducer T goes through the relay contacts R into a tuned transducer preamp, marked TRANSD-PA. After being amplified and also filtered, the signal then passes into the before-described mixer MIX2 where it is hetrodyned back up to the frequency of the filter FILTER and is fed to mixer MIX3. At mixer MIX3 the signal frequency is stepped down through the original frequency range to receive only the lower sideband, and then it passes out of mixer MIX3 into a demodulator DEMOD. At the demodulator, the frequency is converted to audio or voice, where it passes through the transmit-receive relay contacts in position R to the headphone amplifier RXAMP, so that the reception can be heard at the headphones 6.

In order to provide the feature of automatic activation and deactivation upon diver entry into and exit from the sea or other body of water, a moisture sensor switch may be provided, as in the battery pack connection, FIG. 1. Such a sensor may, for example, be of the type described in U.S. Pat. No. 4,096,466 or any other suitable type. The easy changing of batteries or replacement parts is made facile by threadedly sealable end caps, shown dotted in FIG. 1. While the invention has been described in terms of retrofitting existing masks to integrate therewith, as before stated, a mask may be initially molded to provide for the incorporation of the components and connections therein, wherein the connections will run along (laid against or laid embedded in) inner surfaces of the mask.

Highly successful underwater voice conversation operation has been achieved with apparatus of the drawings using a standard three-way push-to-talk switch integrated into the mask, as described, and providing the diver with a fixed switch location, eliminating the need for searching for a switch when at work —— and having capability of switching between hands-free-voice (VOX) or push-to-talk (PTT) operation while the diver is submerged. The mask incorporated the desired, non-ultrasonic field-interfering and low streamlined profile cylinders, with no potential fouling protrusions. Is also embodied the totally waterproof microphone described that operated independently of depth and with the vibration noise-cancelling system above-described that greatly reduced bubble and vibration noise. Power automatically turned on upon entering the water and shut down after a short delay when leaving the water, conserving battery power. Rechargeable Ni-Cad batteries were employed with single sideband operation at a carrier (and transducer frequency) of 32.5KHz. Operation over 3000 feet of range, with depths up to 250 feet, was successfully obtained.

Further modifications will also occur to those skilled in this art, and such are considered to fall within the spirit and scope of the invention as defined in the appended claims.

What is claimed is:

1. An integrated diver's face mask and ultrasound underwater communication apparatus having, in combination with the face mask, a pair of adjacent first and second enclosures integrally connected transversely along and to the top of the mask, the first enclosure containing ultrasound frequency transmitting-receiving electronics and the second containing a battery power supply, with an ultrasound transducer provided at the forward end of the first enclosure; earphone means connected at the sides of the mask integrally therewith and exposed inwardly thereof; microphone means supported near the lower portion of the mask within the same and on one side thereof; and electrical connections laid along the mask surfaces to interconnect the microphone to the transmitting electronics and the earphones to the receiving electronics in the first enclosure, and the said transmitting-receiving electronics in the first enclosure to the battery power supply in the second enclosure; and the microphone means being provided with means for responding to the diver's voice sounds within the face mask while substantially cancelling ambient mask vibrations produced by bubbles, air regulation, and breathing sounds.

2. An integrated face mask and ultrasound underwater communication apparatus as claimed in claim 1 and in which the said first and second enclosures are compacted adjacent to the top of the mask to minimize the external profile thereof.

3. An integrated face mask and ultrasound underwater communication apparatus as claimed in claim 1 and in which means are provided for automatic turn-on and turn-off in entering and exiting the water.

4. An integrated face mask and ultrasound underwater communications apparatus as claimed in claim 1 and in which the said microphone means comprises a pair of spaced inner and outer piezoelectric surfaces facing in opposite directions so as to be mechanically out-of-phase, with the inner surface facing inwardly of the mask to receive the voice sounds; and means is provided for electrically connecting the surfaces to the said receiving electronics 60 that the voice sounds transduced into electrical signals by the inner surface are fed to the receiving electronics, but the said vibrations are transduced by both surfaces into opposite substantially cancelling electrical signals.

5. An integrated face mask and underwater communication apparatus as claimed in claim 1 and in which means is provided, operated at an external portion of the mask near the region of the microphone means for enabling the diver to transmit either under switch control (push-to-talk) or automatically (VOX) in response to voice sounds only, and to receive in the absence of transmission of voice sounds only.

6. An integrated face mask and underwater communication apparatus as claimed in claim 5 and in which means are provided so that the diver's voice sounds as transmitted are reproduced in the said earphones to verify voice transmission.

7. An integrated face mask and ultrasound underwater communication apparatus as claimed in claim 1 and in which the transmitting electronics comprises an amplitude-modulated carrier transmitter provided with means for suppressing both carrier and one of the sidebands.

8. An underwater communication apparatus having, in combination, a waterproof microphone comprising a pair of spaced inner and outer piezoelectric surfaces facing in opposite directions so as to be mechanically out-of-phase, the inner surface facing inwardly to receive voice sounds and both surfaces receiving ambient vibrations from bubbles and air regulation; means for electrically connecting the surfaces in phase to receiving electronics such that the voice sounds transduced into electrical signals by the inner surface are fed to the receiving electronics, but vibrations are transduced by both surfaces into opposite substantially cancelling electrical signals.

* * * * *